July 14, 1936.  L. A. CURRIER  2,047,193
IMPACT TESTING APPARATUS
Filed Dec. 20, 1929
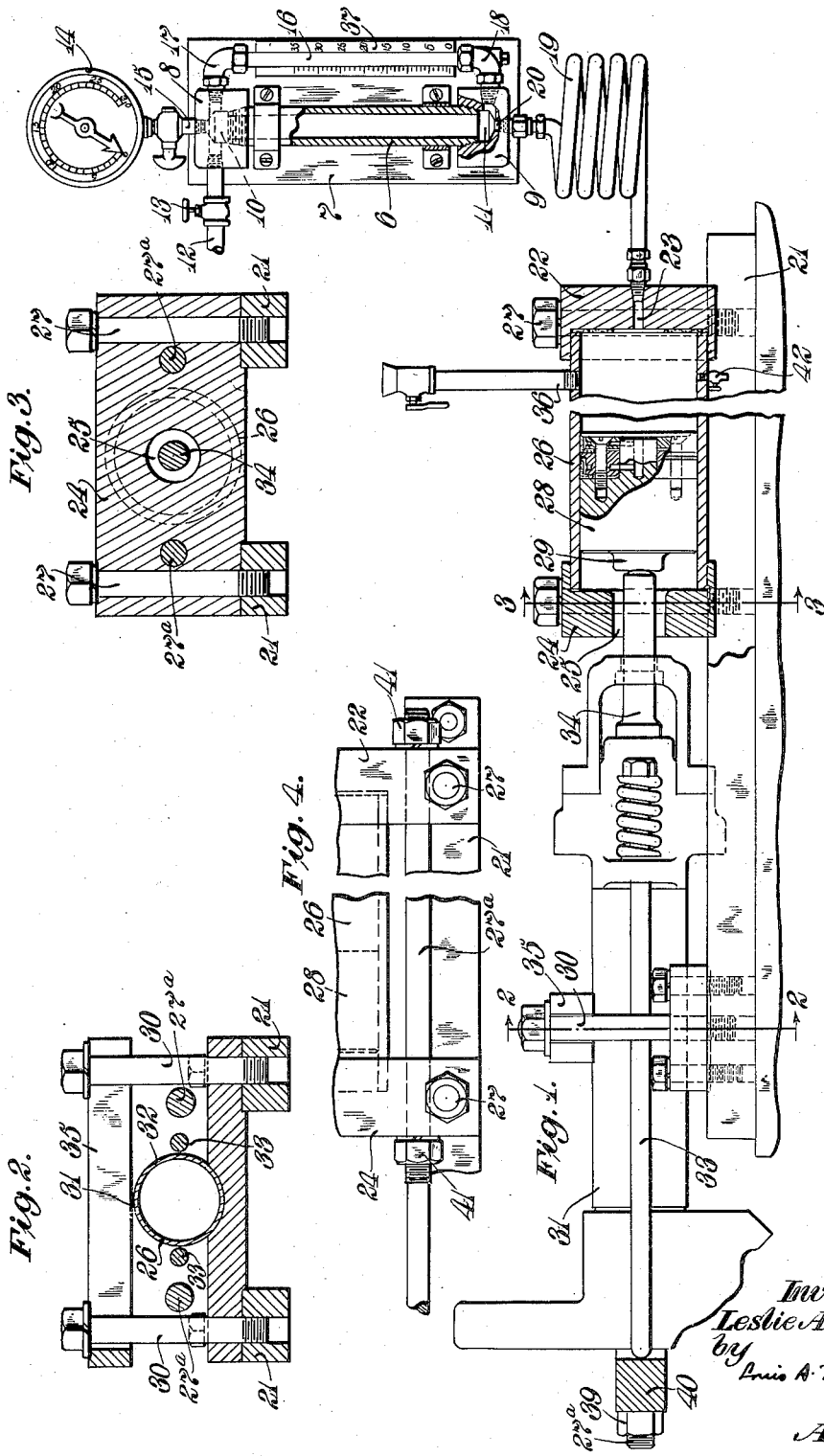
Inventor:
Leslie A. Currier,
by
Louis A. Maxson.
Atty.

Patented July 14, 1936

2,047,193

UNITED STATES PATENT OFFICE 2,047,193

IMPACT TESTING APPARATUS

Leslie A. Currier, Claremont, N. H., assignor to Sullivan Machinery Company, a corporation of Massachusetts Application December 20, 1929, Serial No. 415,554

5 Claims. (Cl. 265—13)

My invention relates to apparatus for testing percussive motors for determining the force of the blow delivered by the motor. More particularly, my invention relates to apparatus for measuring the effectiveness of a rock drill or similar tool having a percussive motor. One object of my invention is to provide an improved apparatus for determining the power of a motor of the percussive type. Further objects of my invention will become apparent in the course of the ensuing description, and will be more particularly pointed out in the accompanying claims.

In one form, my invention may comprise a receptable containing a gas, in combination with means for indicating the degree of compression of the gas and means actuated by the percussive motor being tested for compressing said gas. If desired, the compressing means may be a pump separate from the receptacle, for instance a cylinder and piston. In such case, it is advantageous to use a liquid to transmit pressure from the separate pump to the receptacle containing the gas. A still greater advantage is obtained if the passage for liquid between the pump and the receptacle restricts flow of liquid.

For purposes of illustration, one embodiment which my invention may assume is disclosed in the accompanying drawing in which,—

Fig. 1 is a view partially in side elevation, but mainly in central section, of testing apparatus cooperating with a rock drill of the percusssive motor type.

Fig. 2 is a vertical transverse section on line 2—2 of Fig. 1.

Fig. 3 is a similar section on line 3—3 of Fig. 1.

Fig. 4 is a fragmentary plan view of one side of the horizontal cylinder and its support shown in Fig. 1.

This illustrative embodiment of my invention includes a receptacle 6 mounted on a bracket 7. In the particular form shown in the drawing the receptacle 6 is a cylinder or pipe extending between an upper block 8 and a lower block 9, the bore of the receptacle 6 communicating at one end with a chamber 10 in the block 8 and at its other end with a chamber 11 in the block 9. An inlet pipe 12 controlled by a valve 13 is connected to the chamber 10 and is attached to supply gas, for example, air, from any suitable source. The valve 13 may be closed when sufficient gas has been introduced into the receptacle 6. A pressure gauge 14 is connected by a valve controlled conduit 15 with the chamber 10. A tube 16 of glass or other translucent material is disposed parallel to the receptacle 6 and is connected to the chamber 10 by an elbow 17 and to the chamber 11 by an elbow 18. A pipe 19 is connected by a port 20 with the chamber 11. The pipe 19 may include a coil to take up vibrations produced in the pumping mechanism next to be described.

The mechanism so far described constitutes in effect a liquid operated pressure gauge having means for transmitting to it the forces to be measured and provided with means for effecting variation in a known manner of its sensitivity.

The pumping mechanism mentioned is, in the particular form shown herein, of the cylinder and piston type, and pumps oil or other suitable liquid into the chamber 11 and then upwardly within the receptacle 6 and tube 16 until the gas contained within the receptacle and tube reach a pressure such that the percussive motor will no longer increase such pressure. The pumping mechanism rests on a support 21 and is provided with a head 22 having a passage 23 to which an end of the pipe 19 is connected. A back head 24, provided with an opening 25, is spaced from the head 22 and between the two heads extends a cylinder member 26. Bolts 27 secure the two heads to the base 21 and side rods 27$^a$ connect the heads together. A piston 28 is reciprocable within the cylinder 26 and is provided with a striking head 29 at its rear end. Two bolts 30 extend upwardly from the base 21 at a distance rearwardly from the back head 24. A rock drill 31 having a cylinder 32 and side rods 33 may be disposed on the base 21 so that a striking member 34 which receives blows from the percussive motor of the drill may abut against the striking head and drive the piston 28 forwardlly. The drill 31 may be clamped to the base 21 by a horseshoe shaped cross-piece 35 clamped underneath the heads of the two bolts 30.

In the operation of my improved measuring apparatus two methods may be followed. In either case the cylinder 26 and pipe 6 will be filled with oil or other suitable liquid as through the stand pipe 36, which is provided with a suitable plug valve that may be closed only after the pipe is entirely filled thereby eliminating the possibility of an air pocket therein. In the first method, in filling the spaces just mentioned it is preferable that the piston 28 be in its extreme left-hand position and that pipe 6 be filled to a given level which might be gaged by the level of the liquid in the transparent gage tube 16 and its associated graduated scale 37, this level being preferably zero. To insure that the piston 28 is in its extreme left-hand position and that the air trapped in the pipe 6 above the liquid level is under a predetermined pressure, air pressure may be admitted through pipe 12 until the pressure gage 14 indicates some predetermined pressure. Valve 13 is then closed and if desired the pressure gage 14 also may be closed off from the pipe 6 by its valved controlled conduit 15. Thus upon operation of the percussive motor 31 to be tested its hammer piston will impart blows to the member 34 which in turn will transmit the hammer blow forces to piston 28 and cause the same to move toward the right and through the medium of the oil compress the trapped air in pipe 6. During this compression the liquid level in pipe 6 and also gage 6 will move upwardly until the trapped air is compressed to a pressure where the force of the hammer blows is balanced at which time the liquid level will remain substantially stationary whereupon the reading on scale 37 may be taken. There are no perceptible fluctuations in the liquid level in pipe 6 or gage 16 because of the rapid succession of hammer blows imparted to the member 34 and hence the reading on scale 37 gives a substantially true index of the operation of the motor 31 being tested. To test another motor and thus obtain a comparison, possibly with some desirable standard, the operation will be the same in that the initial liquid level in gage tube 16 will be brought to the same reading on scale 37 which was used with the previous test and also the same initial air pressure will be applied above the liquid level. With this mode of operation there will be no errors due to having different volumes of trapped air for different tests.

In the second method of operation the necessity for obtaining the same initial liquid level in pipe 6 for each different test is eliminated, in that pipe 6 is filled to any level and any desired degree of air pressure is admitted through pipe 12 so as to insure that piston 28 is in its extreme left position, and that some initial pressure is applied on the system. The pipe 12 is then closed and the usual valved conduit 15 is opened, or is already open, whereupon operation of the hammer motor to be tested will cause transmission of pressure to gage 14 so that the indicating hand thereof will register the pressure created by the hammer motor. Preferably the pipe 19 does not provide a passageway of too large a cross-section so that the oil is caused to be gradually forced through the same and thus contribute to the stability of operation.

It will be further understood that in case a small amount of oil should leak from the apparatus or should a finer adjustment be desired to obtain the initial zero liquid level, the motor 31 and piston 28 may be moved to the right by tightening nuts 39 which are threaded on the extended portions of side rods 27ª. These rods extend rearwardly through a cross member 40 disposed transversely of the motor and in addition each has nuts 41 for holding the cylinder heads 22 and 24 independently of any adjustment of nuts 39. To allow adjustment of motor 31 to the left, nuts 39 and clamp 35 may be loosened whereby air pressure in cylinder 6 will move piston 28 and motor 31 to the left as nuts 39 are adjusted. If an excess quantity of oil is present, the liquid level also may be adjusted merely by slightly opening a drain cock 42.

Having once determined a certain pressure increase or indication, on either the pressure gage 14 or liquid gage 16, to be the standard for a percussive motor of any given type, it is obviously a simple matter to compare such a standard motor with other motors of the same type as they are manufactured. My apparatus is of assistance therefore to manufacturers of tools which have a percussive motor and since my apparatus operates simply and expeditiously to indicate clearly the efficiency of the motor, it is obvious that I have provided a measuring apparatus which has wide usefulness.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. Apparatus for measuring the blows delivered by percussive motors including a receptacle, means for filling said receptacle with gas at different predetermined pressures, means for compressing said gas comprising a liquid piston and means for transmitting to said liquid piston the blows of a percussive motor, and means associated with said receptacle for enabling the notation of the degree of compression of the gas.

2. Apparatus for determining the blows delivered by percussive motors comprising a receptacle for containing gas, means for filling said receptacle with gas at different predetermined pressures, means actuated by a motor undergoing test for compressing the gas, and means for indicating the degree of compression of the gas.

3. Apparatus for measuring the blows delivered by percussive motors including, in combination, means to receive the blows of the motor to be tested, liquid means for transmitting the force of said blows, a gaseous column having means associated therewith for indicating the force of the blows and connected with said liquid force transmitting means, means for providing different initial pressure conditions in said column, and means for determining the exact nature of such conditions.

4. Apparatus for measuring the blows delivered by percussive motors including, in combination, means to receive the blows of the motor to be tested, liquid means for transmitting the force of said blows, a gaseous column having means associated therewith for indicating the force of the blows and connected with said liquid force transmitting means, means for providing different initial pressure conditions in said column, and means for determining the exact nature of such conditions connectible with said column to permit observation of the conditions therein and having means for thereafter disconnecting the same from said column.

5. Apparatus for measuring the blows delivered by percussive motors including, in combination, means to receive the blows of the motor to be tested, liquid means for transmitting the force of said blows, a gaseous column having means associated therewith for indicating the force of the blows and connected with said liquid force transmitting means, means for providing different initial pressure conditions in said column, and means for determining the exact nature of such conditions including a calibrated pressure gage and a valved connection between the same and said column.

LESLIE A. CURRIER.